(12) United States Patent
Lee et al.

(10) Patent No.: US 8,534,858 B2
(45) Date of Patent: Sep. 17, 2013

(54) DISPLAY DEVICE WINDOW PROTECTOR HAVING LIGHT-SHIELDING FILM ON INCLINED SURFACE PORTION

(75) Inventors: Sang-Hee Lee, Yongin (KR); Hwan-Jin Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 291 days.

(21) Appl. No.: 13/117,067

(22) Filed: May 26, 2011

(65) Prior Publication Data

US 2012/0075838 A1 Mar. 29, 2012

(30) Foreign Application Priority Data

Sep. 27, 2010 (KR) ........................ 10-2010-0093287

(51) Int. Cl.
*B65D 85/20* (2006.01)
*G09F 13/08* (2006.01)
(52) U.S. Cl.
USPC ............ 362/97.2; 362/633; 362/632; 349/58; 428/432
(58) Field of Classification Search
USPC ........... 362/632, 633, 97.2; 349/58; 428/432
See application file for complete search history.

(56) References Cited

U.S. PATENT DOCUMENTS

| 6,498,672 B2 | 12/2002 | Saitoh |
| 2009/0079706 A1 | 3/2009 | Mishima et al. |
| 2010/0024204 A1 | 2/2010 | Min et al. |
| 2010/0103599 A1 | 4/2010 | Kwak et al. |

FOREIGN PATENT DOCUMENTS

| JP | 2002-098949 A | 4/2002 |
| JP | 2003-248214 A | 9/2003 |
| KR | 10-0793011 B1 | 1/2008 |
| KR | 10-2009-0032001 A | 3/2009 |
| KR | 10-2010-0046903 A | 5/2010 |

*Primary Examiner* — Ismael Negron
(74) *Attorney, Agent, or Firm* — Knobbe, Martens, Olson & Bear LLP

(57) ABSTRACT

A display device includes a display unit configured to display an image and a window protector installed in front of the display unit and connected to the display unit through an adhesive. The window protector having a surface facing the display unit, at least a portion of the surface is inclined with respect to the remaining portion of the surface, and a light-shielding film formed on at least the inclined surface. In one embodiment, a height difference is not generated due to the forming of the light-shielding film by forming the inclined surface on the window protector and forming the light-shielding film on one surface of the window protector including the inclined surface.

18 Claims, 3 Drawing Sheets

DISPLAY DEVICE WINDOW PROTECTOR HAVING LIGHT-SHIELDING FILM ON INCLINED SURFACE PORTION

CROSS-REFERENCE TO RELATED PATENT APPLICATION

This application claims the benefit of Korean Patent Application No. 10-2010-0093287, filed on Sep. 27, 2010, in the Korean Intellectual Property Office, the disclosure of which is incorporated herein in its entirety by reference.

BACKGROUND

1. Field

The described technology generally relates to a display device, wherein a light-shielding film and an adhesive are easily formed between a display unit and a window protector.

2. Description of the Related Technology

Generally, a liquid display panel is a passive display device that displays an image by receiving an external light. The liquid display panel includes a display unit, a light emitting unit, and a circuit board for supplying driving signals to the display unit and the light emitting unit.

Since a liquid crystal display device is not self-emissive, the light emitting unit, such as a back light unit, is installed on a rear surface of the liquid display panel so as to supply light toward the display unit that displays an image. Accordingly, the image may be observed even in a dark place. The back light unit is used for a surface light source device, such as a lighting sign, aside from the passive display device, such as the liquid display panel.

Meanwhile, in order to improve luminance and visibility, adhesion between the display unit and a window protector may be improved and at the same time, a light-shielding property of the display device may be improved in the display device, such as the liquid display panel.

SUMMARY

One inventive aspect is a display device, wherein adhesion between a display unit and a window protector is improved.

Another aspect is a display device having improved light-shielding property.

Another aspect is a display device including: a display unit for displaying an image; and a window protector installed in front of the display unit and combined to the display unit through ah adhesive, wherein a light-shielding film is formed along an edge of a surface of the window protector, which faces the display unit, and the surface of the window protector, on which the light-shielding film is formed, comprises an inclined surface.

The surface of the window protector, on which the light-shielding film is formed, may further include a second surface that extends from an edge of a first surface directly contacting the adhesive and has a different height from the first surface, and the second surface may be connected to the first surface through the inclined surface.

A thickness of the window protector on the second surface may be thinner than a thickness of the window protector on the first surface.

The light-shielding film may extend from the inclined surface to the second surface. The light-shielding film may include a plurality of light-shielding layers, wherein coated areas of the plurality of light-shielding layer may be different from each other.

The coated areas may increase from a light-shielding layer directly formed on the second surface to a light-shielding layer formed farthest from the second surface.

The adhesive may be overlapped on at least a part of the light-shielding layer formed farthest from the second surface. The inclined surface on which the light-shielding film may be formed extends from an edge of the first surface directly contacting the adhesive to an edge of the window protector.

The window protector may be formed by injection molding a polymer resin. The light-shielding film may be a blackish coating layer. The adhesive may be an optically clear adhesive tape.

DETAILED DESCRIPTION

Hereinafter, embodiments will be described more fully with reference to the accompanying drawings.

Figure 1:
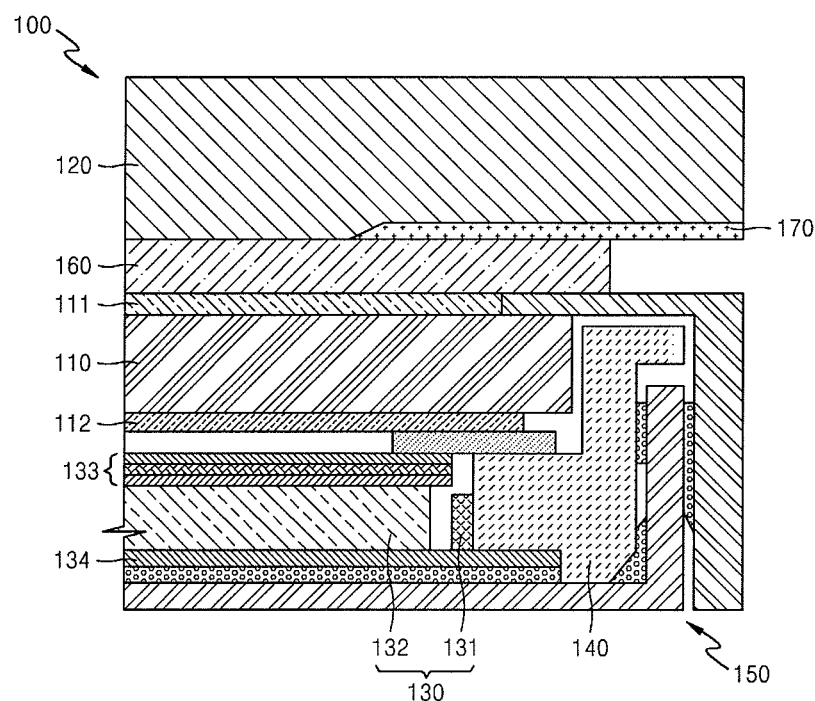
FIG. 1 is a partial cross-sectional view of a display device according to an embodiment.

FIG. 1 is a partial cross-sectional view of a display device 100 according to an embodiment.

Referring to FIG. 1, the display device 100 includes a display unit 110 for displaying an image, a window protector 120 installed in front of the display unit 110, and a light emitting unit 130 installed at the rear of the display unit 110.

In one embodiment, the display unit 110 includes a device for realizing an image through a display area such as a liquid display panel. Alternatively, the display unit 110 may be a self-emitting electroluminescent device or a plasma display panel. When the display unit 110 is a self-emitting display device, the display device 100 does not include a light emitting unit that supplies a light.

When the display unit 110 is a liquid display panel, the display unit 110 includes a first substrate, a second substrate, and a liquid crystal interposed therebetween. Also, a first polarizing plate 111 and a second polarizing plate 112, which are used to selectively penetrate through a certain light, are respectively adhered to external surfaces of the display unit 110.

The window protector 120 is adhered in front of the display unit 110 by using an adhesive 160 as a medium. The window protector 120 is used to prevent the display unit 110 from being damaged.

The light emitting unit 130 includes a light source device 131, and a light guide plate 132 for guiding a light emitted from the light source device 131.

The light source device 131 may be an edge light type that irradiates and transmits light to the display unit 110 by being installed at a side wall of the light guide plate 132, or a direct light type that directly irradiates light to the display unit 110 by being installed directly below the display unit 110.

The light source device 131 may be a light emitting diode (LED) or a fluorescent lamp. The fluorescent lamp may be classified into a cold cathode fluorescent lamp (CCFL), wherein an electrode at each end is installed inside a tube, and an external electrode fluorescent lamp (EEFL), wherein an electrode at each end is installed outside a tube, according to a configuration of an electrode. Since the LED is small, consumes low power, and has high reliability, the LED is suitable as a light source device for a display device.

The light guide plate 132 may be installed below the display unit 110. The light guide plate 132 guides and provides the light supplied from the light source device 131 installed at the side wall to the display unit 110. The light emitting unit 130 may have a certain pattern so as to provide a uniform surface light source.

An optical sheet 133 is disposed between the display unit 110 and the light guide plate 132. The optical sheet 133 may be formed of at least one sheet including a diffusion sheet and a prism sheet. The optical sheet 133 diffuses or concentrates the light guided from the light guide plate 132 so that the light is incident on the display unit 110, as a uniform surface light source.

A reflective sheet 134 is installed on a rear surface of the light guide plate 132, which is opposite to the optical sheet 133. The reflective sheet 134 improves light efficiency by reflecting the light penetrated through the rear surface of the light guide plate 132 to the display unit 110.

A mold frame 140 that situates the display unit 110 and the light emitting unit 130 therein is installed around the display unit 110 and the light emitting unit 130. The mold frame 140 supports and fixes the display unit 110 and the light emitting unit 130, and prevents the display unit 110 and the light emitting unit 130 from being damaged due to external vibration or shock. In one embodiment, the mold frame 140 has a substantially rectangular frame wherein top and bottom surfaces are opened, but a shape of the mold frame 140 is not limited thereto.

Meanwhile, a bezel 150 surrounding the mold frame 140 is installed on an outer surface of the mold frame 140.

Here, a light-shielding film 170 may be formed along an edge of a surface of the window protector 120, which faces the display unit 110, wherein a surface of the window protector 120 on which the light-shielding film 170 is formed includes an inclined surface.

The window protector 120 and the light-shielding film 170 will now be described in detail.

Figure 2:
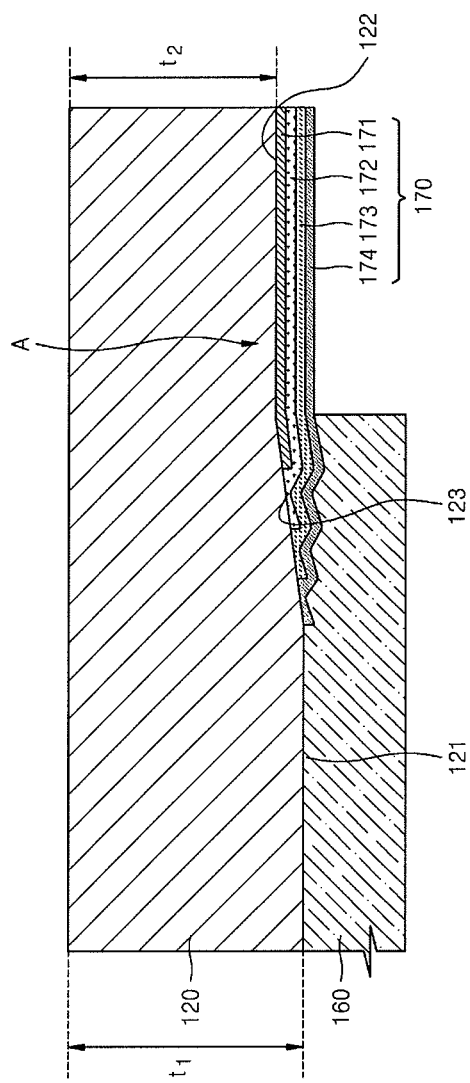
FIG. 2 is a partial magnified cross-sectional view of the display device of FIG. 1 according to an embodiment.

FIG. 2 is a partial magnified cross-sectional view of the display device of 100 FIG. 1 according to an embodiment.

Referring to FIG. 2, the adhesive 160 is disposed on a bottom surface of the window protector 120, i.e., a first surface 121 of the window protector 120, which faces the display unit 110 of FIG. 1, so as to fix the window protector 120 to the display unit 110.

In one embodiment, an optically clear adhesive (OCA) tape is used as the adhesive 160 in order to improve luminance and visibility of the display device 100. The adhesive 160 is formed of a material having substantially the same refractive index as the window protector 120, and thus reduces luminance loss of the display device 100 and improves visibility by removing light noise of external light.

Consequently, the window protector 120 may be formed at least partially of glass or a polymer resin such as polymethyl methacrylate (PMMA)-based material, and the adhesive 160 may be an acryl-based OCA tape.

At least one layer of light-shielding film 170 is formed on the edge of the window protector 120. The light-shielding film 170 not only blocks an external light, but is also formed so that the display device 100 has a fine external shape. The light-shielding film 170 may be a blackish coating layer, such as a coating layer including black chrome, so as to improve a light-shielding property, or may include any color according to needs.

The light-shielding film 170 may be formed by any method, such as an ink method, a deposition method, or a screen printing method. Here, if a bright color, such as white, is applied to the light-shielding film 170, the light-shielding property may be sufficient, thereby causing the light to shine inside the window protector 120. Accordingly, the light-shielding film 170 having a desired thickness may be formed by depositing a raw material for forming the light-shielding film 170 several times.

The light-shielding property may improve if the thickness of the light-shielding film 170 increases, but adhesion may decrease if the light-shielding film 170 is formed on an entirely horizontal surface of the first surface 121 of the window protector 120.

When the adhesive 160 is used to adhere the window protector 120 to the display unit 110, bubbles may be generated in a region where the adhesive 160 overlap on the light-shielding film 170 having a multi-layer structure, since the adhesive 160 may be detached from the window protector 120 due to a height difference of the light-shielding film 170.

In one embodiment, the window protector 120 inclines from the first surface 121 to an area A where the light-shielding film 170 is formed.

The area A of the window protector 120, where the light-shielding film 170 is formed, includes a second surface 122 that extends from the edge of the first surface 121 to which the adhesive 160 is directly adhered, and has a flat surface having a different height from the first surface 121.

The second surface 122 has a predetermined width along the edge of the window protector 120. The first surface 121 and the second surface 122 are connected to each other through an inclined surface 123.

The light-shielding film 170 extends from the inclined surface 123 to the second surface 122, and includes at least one layer. The light-shielding film 170 includes a first light-shielding layer 171 directly formed on the second surfaced 122, a second light-shielding layer 172 formed on the first light shielding layer 171, a third light-shielding layer 173 formed on the second light-shielding layer 172, and a fourth light-shielding layer 174 formed on the third light-shielding layer 173. In the current embodiment, the light-shielding film 170 has a stacked structure of four layers, but a number of layers is not limited as long as the light-shielding film 170 has a desired thickness.

In one embodiment, when t1 denotes the thickness of the window protector 120 on the first surface 121, and t2 denotes the thickness of the window protector 120 on the second surface 122, the thickness t2 is thinner than the thickness t1, and the edge of the first surface 121 and the edge of the second surface 122 are connected to each other through the inclined surface 123.

A coated area of the light-shielding film 170 increases from the first light-shielding layer 171 directly formed on the surface of the second surface 122 to the fourth light-shielding layer 174 formed farthest from the second surface 122.

As such, coating areas of the first through fourth light-shielding layers 171-174 are different from each other according to the height difference between the first and second surfaces 121 and 122 and an inclination angle of the inclined surface 123.

Here, a surface of the fourth light-shielding layer 174 constituting the outermost layer may be substantially on the same surface as the first surface 121 directly contacting the adhesive 160, so that a thickness difference of the light-shielding film 170 in the region where the adhesive 160 overlap is minimized.

As described above, the window protector 120 includes the first surface 121 facing the display unit 110, the second surface 122 having a different height from the first surface 121, and the inclined surface 123 connecting the first and second surfaces 121 and 122. The window protector 120 having such a shape may be easily formed via injection molding.

According to the display device 100 according to the current embodiment, the window protector 120 is prepared, and the light-shielding film 170 including the first through fourth light-shielding layers 171 through 174 is stacked on the area A where the light-shielding film 170 is formed, along the edge of the surface of the window protector 120, which faces the display unit 110.

Here, the coated area of the first light-shielding layer 171 directly contacting the second surface 122 is the smallest, and the coated area of the fourth light-shielding layer 174 formed farthest from the second surface 122 is the largest. Accordingly, inclination angle of a height difference may be reduced via surface tension of a light-shielding material of the light-shielding film 170, for example, ink.

Then, the adhesive 160 constituting an OCA tape is adhered on the first surface 121. Here, the adhesive 160 is not only adhered to the first surface 121, but also overlaps on a part of the light-shielding film 170. Accordingly, adhesion at the region where the adhesive 160 overlaps on the light-shielding film 170 is increased, and bubbles are prevented from being generated in the adhesive 160.

Figure 3:
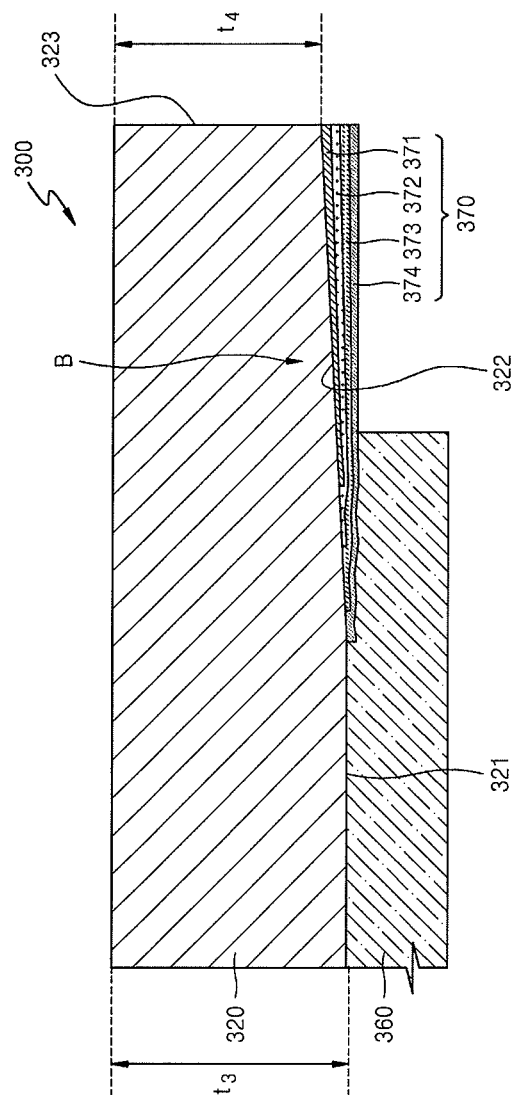
FIG. 3 is a partial magnified cross-sectional view of a display device according to another embodiment.

FIG. 3 is a partial magnified cross-sectional view of a display device 300, according to another embodiment.

Differences between the display device 300 and the display device 100 will be mainly described, and the same structures thereof will not be repeated herein.

Referring to FIG. 3, an adhesive 360 for fixing a window protector 320 to the display unit 110 of FIG. 1 is adhered to a bottom surface of the window protector 320, i.e., a first surface 321 facing the display unit 110. A light-shielding film 370 is formed on an edge of the window protector 320.

An inclined surface 322 is formed from the first surface 321 to an area B where the light-shielding film 370 is formed. The area B of the window protector 320 where the light-shielding film 370 is formed inclines from an edge of the first surface 321 directly contacting the adhesive 360 to an edge 323 of the window protector 320.

The light-shielding film 370 includes at least one layer on the inclined surface 322. The light-shielding film 370 includes a first light-shielding layer 371 directly formed on a surface of the inclined surface 322, a second light-shielding layer 372 formed on the first light-shielding layer 371, a third light-shielding layer 373 formed on the second light-shielding layer 372, and a fourth light-shielding layer 374 formed on the third light-shielding layer 373.

In one embodiment, when t3 denotes the thickness of the window protector 320 on the first surface 321, and t4 denotes the thickness of the window protector 320 on the edge 323, the thickness t4 of the edge 323 is thinner than the thickness t3 of the first surface 321. Also, the thickness of the window protector 320 decreases from the first surface 321 to the edge 323.

Accordingly, a coated area of the light-shielding film 370 increases from the first light-shielding layer 371 directly formed on the inclined surface 322 to the fourth light-shielding layer 374 formed farthest from the inclined surface 322.

According to the display device 300 according to the current embodiment, the window protector 320 is prepared, and the light-shielding film 370 including the first through fourth light-shielding layers 371-374 is stacked on the area B where the light-shielding film 370 is formed, along the edge of the surface of the window protector 320, which faces the display unit 110.

Since a coated area of the first light-shielding layer 371 is the smallest and a coated area of the fourth light-shielding layer 374 formed farthest from the inclined surface 322 is the largest, an inclination angle of a height difference of the light-shielding film 370 may be reduced.

Here, a surface of the fourth light-shielding layer 374 constituting the outermost layer may be substantially on the same surface as the first surface 321 directly contacting the adhesive 360, so that a thickness difference of the light-shielding film 370 in the region where the adhesive 360 overlap on at least a part of the fourth light-shielding layer 374 is minimized.

At least one of the disclosed embodiments provides the following benefits.

First, the height difference is not generated due to the formation of the light-shielding film since the inclined surface is formed on the window protector, and the light-shielding film is formed on one surface of the window protector including the inclined surface. Accordingly, even when the adhesive disposed between the display unit and the window protector is overlapped at the light-shielding film, adhesion of the adhesive is improved since bubbles are not formed in the adhesive.

Second, at least one layer of the light-shielding film is easily stacked since the window protector includes the inclined surface. Accordingly, a light-shielding property of the display device is improved.

Third, since the adhesive having substantially the same refractive index on an optical path of the window protector can be used, light noise due to external light is reduced, thereby remarkably improving visibility.

While embodiments have been shown and described with reference to the accompanying drawings, it will be understood by those of ordinary skill in the art that various changes in form and details may be made therein without departing from the spirit and scope of the following claims.

What is claimed is:
1. A display device comprising:
a display unit configured to display an image;
a window protector installed in front of the display unit and connected to the display unit through an adhesive, wherein the window protector comprises a first surface which faces the display unit, wherein at least a first portion of the first surface is inclined with respect to a remaining portion of the first surface; and
a light-shielding film formed on the first portion of the first surface.
2. The display device of claim 1, wherein the window protector is formed at least partially of glass or a polymer resin.
3. The display device of claim 1, wherein the light-shielding film is a blackish coating layer.
4. The display device of claim 1, wherein the adhesive is an optically clear adhesive tape.
5. The display device of claim 1, further comprising a light emitting unit formed at the rear of the display unit,
wherein the light emitting unit comprises:
a light guide plate configured to guide light to the display device; and
a plurality of light source devices configured to supply light to the light guide plate.
6. The display device of claim 1, wherein the inclined surface on which the light-shielding film is formed extends from an edge of the first surface directly contacting the adhesive to an edge of the window protector.
7. The display device of claim 6, wherein the thickness of the edge of the window protector is thinner than the thickness of the window protector on the first surface.

8. The display device of claim 6, wherein the light-shielding film comprises a plurality of light-shielding layers, and wherein the thickness of each of the light-shielding layers varies along the surface of the window protector.

9. The display device of claim 8, wherein the thicknesses of the light-shielding layers increase from a light-shielding layer directly formed on the inclined surface to a light-shielding layer formed farthest from the inclined surface.

10. The display device of claim 8, wherein the adhesive overlaps with at least part of the light-shielding layer formed farthest from the inclined surface.

11. The display device of claim 1, wherein the remaining portion of the surface of the window protector further comprises a second surface that extends from an edge of a first surface directly contacting the adhesive and has a different height from the first surface, and wherein the inclined surface interconnects the first and second surfaces.

12. The display device of claim 11, wherein the thickness of the window protector corresponding to the second surface is thinner than the thickness of the window protector corresponding to the first surface.

13. The display device of claim 11, wherein the light-shielding film extends from the inclined surface to the second surface.

14. The display device of claim 13, wherein the light-shielding film comprises a plurality of light-shielding layers, and wherein the thickness of each of the light-shielding layers varies along the surface of the window protector.

15. The display device of claim 14, wherein the thicknesses of the light-shielding layers increase from a light-shielding layer directly formed on the second surface to a light-shielding layer formed farthest from the second surface.

16. The display device of claim 15, wherein the shielding layers are inclined with respect to the first surface.

17. The display device of claim 15, wherein a surface of the light-shielding layer formed farthest from the second surface has substantially the same flat surface as the first surface.

18. The display device of claim 15, wherein the adhesive overlaps with at least part of the light-shielding layer formed farthest from the second surface.

\* \* \* \* \*